United States Patent
Dahan et al.

(10) Patent No.: US 9,609,128 B2
(45) Date of Patent: Mar. 28, 2017

(54) EMERGENCY SIGNAL FOR M2M DEVICES

(71) Applicant: AT&T Intellectual Property I, L.P., Atlanta, GA (US)

(72) Inventors: Joseph Dahan, Redmond, WA (US); Jiansong Wang, Parlin, NJ (US); Rajendra Prasad Kodaypak, Sammamish, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/841,816

(22) Filed: Sep. 1, 2015

(65) Prior Publication Data

US 2017/0064078 A1    Mar. 2, 2017

(51) Int. Cl.
| | |
|---|---|
| *H04M 11/04* | (2006.01) |
| *H04M 3/51* | (2006.01) |
| *H04L 29/08* | (2006.01) |
| *H04M 3/38* | (2006.01) |

(52) U.S. Cl.
CPC .......... *H04M 3/5116* (2013.01); *H04L 67/12* (2013.01); *H04M 3/38* (2013.01)

(58) Field of Classification Search
CPC ............... H04M 11/04; H04M 11/045; H04M 2242/04; H04M 3/42314; H04M 3/5116; G06Q 10/06311; G06Q 50/265
USPC .......................................................... 379/45
See application file for complete search history.

(56) References Cited

U.S. PATENT DOCUMENTS

| | | | |
|---|---|---|---|
| 8,391,458 B1 * | 3/2013 | Bloomcamp | ..... H04M 3/42187 379/207.05 |
| 8,554,169 B2 | 10/2013 | Daly et al. | |
| 8,837,443 B2 | 9/2014 | Yamada et al. | |
| 8,918,075 B2 | 12/2014 | Maier et al. | |
| 8,976,939 B1 * | 3/2015 | Hamilton | ............. H04M 3/5116 379/45 |
| 9,237,243 B2 * | 1/2016 | Jensen | ............. G06Q 10/06311 |
| 2011/0117873 A1 * | 5/2011 | Daly | .................... G08B 27/005 455/404.1 |
| 2011/0310731 A1 | 12/2011 | Park et al. | |
| 2012/0282875 A1 | 11/2012 | Park et al. | |
| 2012/0302254 A1 | 11/2012 | Charbit et al. | |
| 2013/0083726 A1 | 4/2013 | Jain et al. | |
| 2013/0339438 A1 | 12/2013 | Cherian et al. | |

(Continued)

OTHER PUBLICATIONS

Tapia, et al., "Scaling 911 Messaging for Emergency Operation Centers During Large Scale Events", Proceedings of the ISCRAM Conf., May 2015, 10 pgs.

*Primary Examiner* — Quoc D Tran
(74) *Attorney, Agent, or Firm* — Baker & Hostetler LLP

(57) ABSTRACT

A method includes receiving, at a server connected to a network, a plurality of emergency alerts from a plurality of devices connected to the network. The method also includes analyzing, by the server, the plurality of emergency alerts to determine an emergency type of each of the plurality of emergency alerts. The method includes categorizing, by the server, the plurality of emergency alerts based on the emergency type of each of the plurality of emergency alerts. The method includes prioritizing a first category of the plurality of emergency alerts and consolidating the plurality of emergency alerts of the first category into a consolidated alert. The method includes causing the consolidated alert to be provided to an emergency responder.

11 Claims, 11 Drawing Sheets

(56) References Cited

U.S. PATENT DOCUMENTS

| | | |
|---|---|---|
| 2014/0011505 A1 | 1/2014 | Liao |
| 2014/0153546 A1 | 6/2014 | Kim et al. |
| 2014/0192964 A1* | 7/2014 | Bhogal ................ H04M 3/5116 379/45 |
| 2014/0293964 A1 | 10/2014 | Park et al. |
| 2014/0313014 A1* | 10/2014 | Huh ....................... G08B 7/066 340/7.55 |
| 2014/0357285 A1 | 12/2014 | Smith et al. |
| 2015/0147995 A1 | 5/2015 | Bontu et al. |
| 2015/0163623 A1 | 6/2015 | Kosseifi et al. |

\* cited by examiner

EMERGENCY SIGNAL FOR M2M DEVICES

TECHNICAL FIELD

The technical field generally relates to managing messages from machine-to-machine (M2M) devices and, more specifically, to systems and methods for managing messages directed to a public-safety answering point (PSAP).

BACKGROUND

As the number of M2M devices grows, more M2M devices may be detecting emergency conditions and communicating with a PSAP, without the need for human intervention. It is possible that multiple M2M devices in the same room, for example, may detect and transmit an emergency alert. It is further possible that multiple M2M devices may be transmitting alerts for different emergencies of different priorities simultaneously. If a PSAP were to receive all of these messages, it may overload the PSAP. As the PSAP is how first responders become aware of emergencies, it is essential to public safety that the functionality of the PSAP be maintained. Further, emergency alerts should be prioritized such that the PSAP processes high-priority alerts before processing low-priority alerts. There is a need for methods and systems that decrease the load on the PSAP by filtering and consolidating messages and that enable the PSAP to address more pressing matters first by prioritizing and throttling messages.

SUMMARY

The disclosed systems and methods may allow for managing multiple messages, or emergency alerts, by filtering, consolidating, prioritizing, or throttling messages to prevent overloading of a PSAP.

The present disclosure is directed to a method. The method may include receiving, at a server connected to a network, a plurality of emergency alerts from a plurality of devices connected to the network. The method may also include analyzing, by the server, the plurality of emergency alerts to determine an emergency type of each of the plurality of emergency alerts and categorizing, by the server, the plurality of emergency alerts based on the emergency type of each of the plurality of emergency alerts. The method may also include prioritizing a first category of the plurality of emergency alerts and consolidating the plurality of emergency alerts of the first category into a consolidated alert. The method may also include causing the consolidated alert to be provided to an emergency responder.

The present disclosure is also directed to a method, which may include providing an emergency alert to an emergency responder, from a network entity connected to a network, wherein the emergency alert is indicative of an emergency and associated with a device connected to the network. The method may include receiving a location request from the emergency responder and identifying the device and identifying a network entity based on the device. The method may also include providing the location request and the device identity to the network entity, wherein the network entity initiates a location services procedure to estimate a location of the device. The method may include providing an emergency location to the emergency responder, the emergency location based on at least the estimated location.

The present disclosure is also directed to a system. The system may include a first device and a second device communicatively coupled to a network and a gateway communicatively coupled to a network and a public-safety access point. The gateway may include instructions that, when executed by a processor of the gateway, cause the processor to effectuate operations. The operations may include receiving a first message from the first device, the first message indicative of a first emergency condition detected by the first device and a second message from the second device, the second message indicative of a second emergency condition detected by the second device. The operations may also include determining, based on at least a relative location of the first device and the second device, whether the first emergency condition and the second emergency condition are indicative of a same emergency situation. The operations may also include, based on at least the first emergency condition and the second emergency condition being indicative of the same emergency situation, consolidating the first message and the second message into a consolidated alert to be provided to the public-safety access point.

BRIEF DESCRIPTION OF THE DRAWINGS

Aspects of the herein described telecommunications network are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

DETAILED DESCRIPTION

Figure 1:
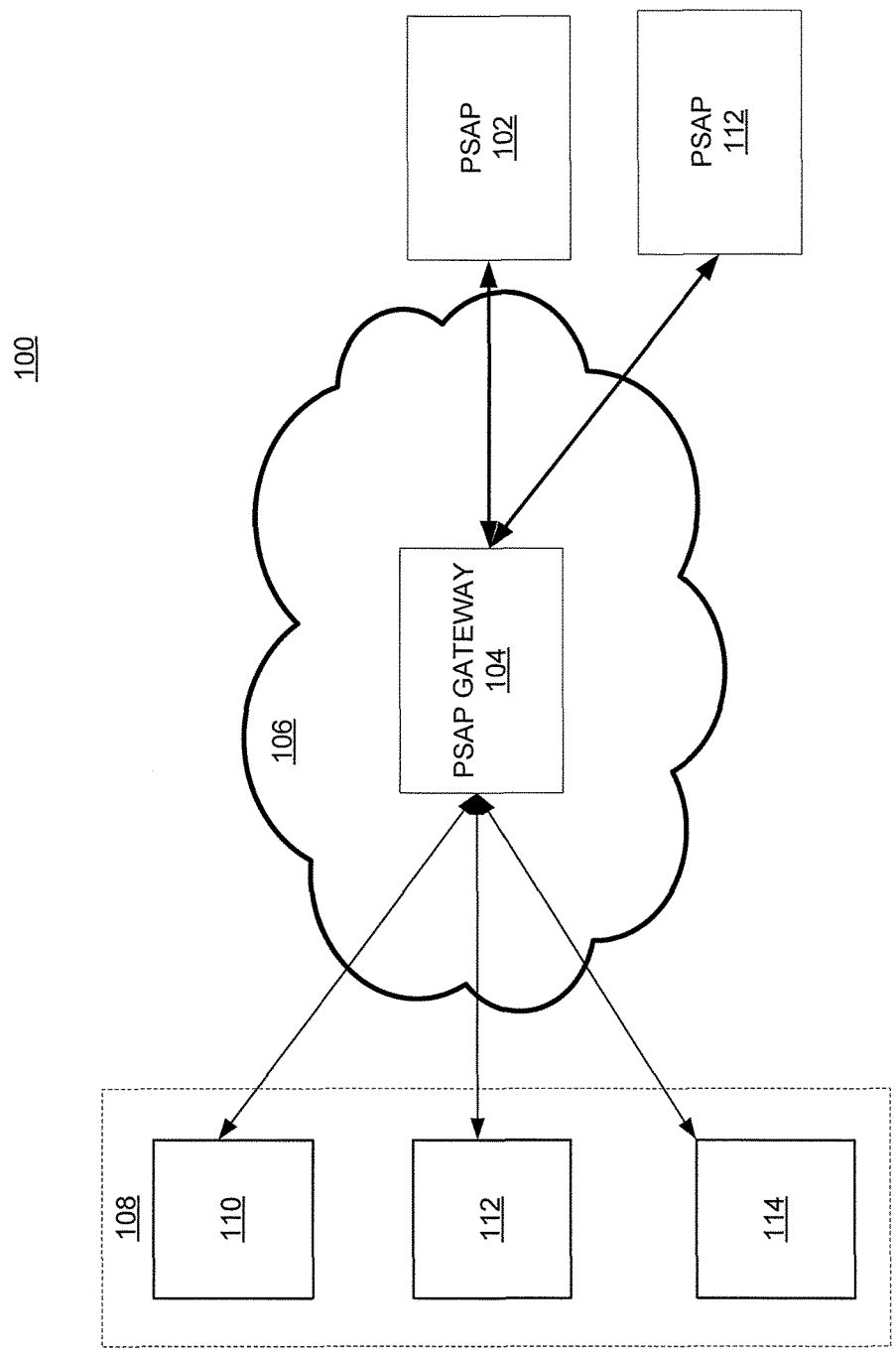
FIG. 1 illustrates an exemplary telecommunication system in which a PSAP gateway may facilitate communications to a PSAP.

FIG. 1 illustrates an exemplary telecommunication system 100 including a PSAP 102. In the context of the present disclosure, PSAP 102 may comprise any appropriate type of equipment, such as, for example, a computer, a server, a mobile device, a tablet, or any type of equipment capable of receiving and processing emergency alerts to dispatch emergency responders. It is to be understood that PSAP 102 as depicted herein is exemplary and not intended to be limiting. Acronyms are used throughout the disclosure that will be understood by those skilled in the art.

Telecommunication system 100 may also include a PSAP gateway 104 in communication with PSAP 102. PSAP gateway 104 may communicate through a subscriber network 106 (e.g., long term evolution (LTE), 5G, etc.). For example, PSAP gateway 104 may communicate with one or more M2M devices 108, including M2M device 110, M2M device 112, or M2M device 114. PSAP gateway 104 may include any device capable of communicating through subscriber network 106. For example, PSAP gateway 104 may comprise a network entity. A network entity may comprise hardware or a combination of hardware and software. PSAP gateway 104 may include or constitute a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. PSAP gateway 104 may include, constitute, or be communicatively coupled to a mobile management entity (MME). PSAP gateway 104 may constitute a single device or multiple devices (e.g., single server or multiple servers, single gateway or multiple gateways, single controller or multiple controllers). PSAP gateway 104 may communicate wirelessly, via hard wire, or any appropriate combination thereof.

M2M devices 108 may include any devices that are capable of communicating with other devices in telecommunication system 100. M2M devices 108 may be configured to transmit emergency alerts based on a trigger, such as detecting an emergency condition. For example, M2M device 110 may transmit an emergency alert upon detecting smoke. Similarly, M2M device 112 may be configured to transmit an emergency alert upon detecting a temperature exceeding a threshold. As another example, M2M device 114 may comprise a GPS that transmits an emergency alert upon detecting that M2M device 114 has traveled a certain distance or is located outside of a predefined geographical boundary. M2M devices 108 may be configured to transmit emergency alerts over a control plane of subscriber network 106. Additionally or alternatively, M2M devices 108 may be configured to transmit emergency alerts over a user plane of subscriber network 106.

Generally, emergency alerts may be received at PSAP 102. However, with the large number of M2M devices 108, including M2M devices 108 that may transmit duplicative or otherwise redundant emergency alerts, PSAP 102 may become overloaded. To manage the load of PSAP 102, PSAP gateway 104 may process emergency alerts received from M2M devices 108. It is to be understood that telecommunication systems 100 and 200 as depicted in FIGS. 1 and 2 are exemplary and not intended to be limiting.

Figure 2:
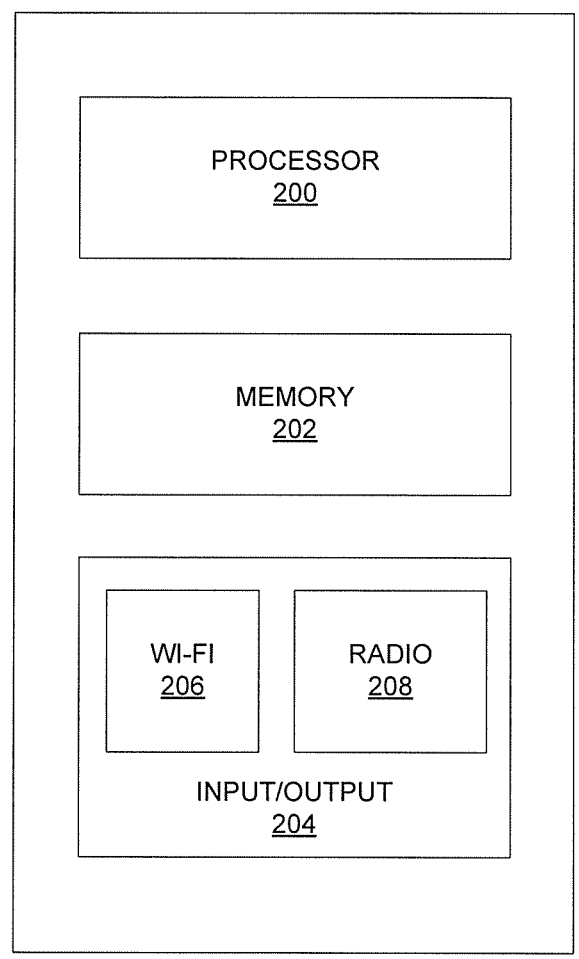
FIG. 2 is a schematic of an exemplary device that may transmit emergency alerts intended for a PSAP.

FIG. 2 is a block diagram of an exemplary M2M device 108 that may be utilized with a telecommunication network as described herein. M2M device 108 may comprise or be incorporated into any appropriate device, including nonconventional devices like a kitchen appliance, a motor vehicle control (e.g., steering wheel), or the like. For example, any object or thing embedded with hardware or software to enable the thing to exchange data may constitute M2M device 108. M2M devices 108 may include devices across any industry. M2M devices 108 may be configured to communicate directly or indirectly to PSAP gateway 104. M2M devices 108 may include appliances or things not found in traditional telecommunication systems, including appliances, like dishwashers, vacuums, televisions, lighting or sound systems, or the like; sensors designed to detect heart rate, smoke, temperature, sound, pressure, water, humidity, movement, or the like; vehicles, including airplanes, drones, automobiles, or the like; tracking devices affixed to living things or objects; or electronic devices, such as mobile devices, tablets, computers, or the like. M2M device 108 may be considered stationary or portable. As evident from the herein description, UE, a device, a communications device, or a mobile device is not to be construed as software per se.

Mobile device 102 may include any appropriate device, mechanism, software, or hardware for communicating with a telecommunication network as described herein. In an example configuration, M2M device 108 may comprise portions including a processor 200, a memory 202, or an input/output 204. Each portion of M2M device 108 may comprise circuitry for performing functions associated with each respective portion. Thus, each portion may comprise hardware or a combination of hardware and software. Accordingly, each portion of M2M device 108 is not to be construed as software per se. It is emphasized that the block diagram depiction of M2M device 108 is exemplary and not intended to imply a specific implementation or configuration. For example, in an example configuration, M2M device 108 may comprise a cellular communications technology, and processor 200 or memory 202 may be implemented, in part or in total, on a subscriber identity module (SIM) of M2M device 108. In another example configuration, M2M device 108 may comprise a laptop computer. The laptop computer may include a SIM, and various portions of processor 200 or memory 202 may be implemented on the SIM, on the laptop other than the SIM, or any combination thereof.

Processor 200, memory 202, and input/output 204 may be coupled together (coupling not shown in FIG. 2) to allow communications therebetween. Input/output 204 may comprise a receiver of M2M device 108, a transmitter of M2M device 108, or a combination thereof. Input/output 204 may be capable of receiving or providing information pertaining to telecommunications as described herein. In various configurations, input/output 204 may receive or provide information via any appropriate means, such as, for example, optical means (e.g., infrared), electromagnetic means (e.g., radio frequency (RF), Wi-Fi, Bluetooth®, ZigBee®), acoustic means (e.g., speaker, microphone, ultrasonic receiver, ultrasonic transmitter), or a combination thereof. For example, as shown in FIG. 2, input/output 204 may include one or more wireless radios, such as Wi-Fi radio 206. For example, input/output 204 may include one or more wireless radios dedicated to broadcast messages, for example, those receiving RF signals, such as a radio 208.

Processor 200 may be capable of performing functions pertaining to telecommunications, including, for example, communicating with other devices in or connected to subscriber network 106. In a basic configuration, M2M device 108 may include at least one memory 202, which may comprise executable instructions that, when executed by processor 200, cause processor 200 to effectuate operations associated with a telecommunication network, such as subscriber network 106. Memory 202 may comprise a storage medium having a concrete, tangible, physical structure. As is known, a signal does not have a concrete, tangible, physical structure. Memory 202, as well as any computer-readable storage medium described herein, is not to be construed as a signal. Memory 202, as well as any computer-readable storage medium described herein, is not to be construed as a transient signal. Further, memory 202, as well as any computer-readable storage medium described herein, is not to be construed as a propagating signal. Memory 202, as well as any computer-readable storage medium described herein, is to be construed as an article of manufacture.

Memory 202 may store any information utilized in conjunction with telecommunications. Depending upon the exact configuration or type of processor, memory 202 may be volatile (such as some types of RAM), nonvolatile (such as ROM or flash memory), or a combination thereof. M2M device 108 may include additional storage (e.g., removable storage or nonremovable storage) including, but not limited to, tape, flash memory, smart cards, CD-ROM, DVD, or other optical storage, magnetic cassettes, magnetic tape, magnetic disk storage or other magnetic storage devices, universal serial bus (USB) compatible memory, or any other medium which can be used to store information and which can be accessed by M2M device 108.

Mobile device 102 may be used to receive or transmit messages through subscriber network 106 from a sender, such as PSAP 102. It may be advantageous for M2M device 108 or another device in or connected to subscriber network 106 to communicate the location of M2M device 108 to PSAP gateway 104 or PSAP 102.

Figure 3:
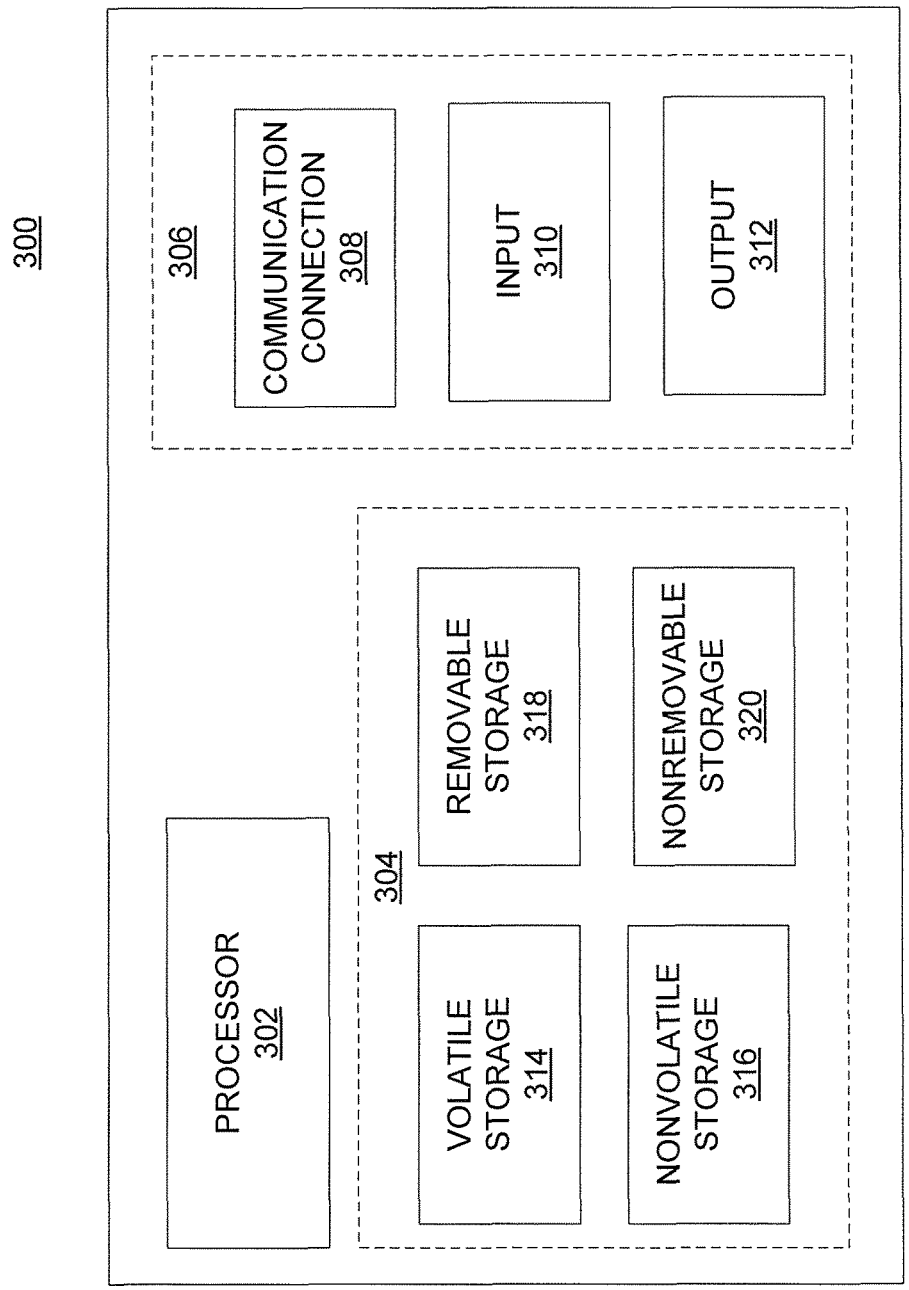
FIG. 3 is a schematic of an exemplary network entity.

FIG. 3 is a block diagram of network entity 300 of a telecommunication network (e.g., subscriber network 104) as described herein. For example, PSAP gateway 104 may comprise, include, or communicate with network entity 300. Network entity 300 may comprise hardware or a combination of hardware and software. The functionality to facilitate telecommunications via a telecommunications network may reside in any one or combination of network entities 300. Network entity 300 depicted in FIG. 3 may represent or perform functionality of any appropriate network entity 300, or combination of network entities 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a specific implementation or configuration. Thus, network entity 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network entity 300 may comprise a processor 302 and a memory 304 coupled to processor 302. Memory 304 may contain executable instructions that, when executed by processor 302, cause processor 302 to effectuate operations associated with telecommunications via subscriber network 106. As evident from the description herein, network entity 300 is not to be construed as software per se.

In addition to processor 302 and memory 304, network entity 300 may include an input/output system 306. Processor 302, memory 304, and input/output system 306 may be coupled together (coupling not shown in FIG. 3) to allow communications therebetween. Each portion of network entity 300 may comprise circuitry for performing functions associated with each respective portion. Thus, each portion may comprise hardware, or a combination of hardware and software. Accordingly, each portion of network entity 300 is not to be construed as software per se. Input/output system 306 may be capable of receiving or providing information from or to a communications device or other network entities configured for telecommunications. For example input/output system 306 may include a wireless communications (e.g., 2.5G/3G/4G/GPS) card. Input/output system 306 may be capable of receiving or sending video information, audio information, control information, image information, data, or any combination thereof. Input/output system 306 may be capable of transferring information with network entity 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network entity 300 also may contain communication connection 308 that allows network entity 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network entity 300, determining a type of broadcast message and acting according to the broadcast message type or content, as described herein.

Memory 304 of network entity 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network entity 300. Memory 304 may comprise executable instructions that, when executed by processor 302, cause processor 302 to effectuate operations to provide broadcast messages to devices through subscriber network 106.

Returning to FIG. 1, an exemplary implementation of telecommunication system 100 will be discussed. PSAP gateway 104 may be communicatively coupled to PSAP 102 and network 106. PSAP gateway 104 may receive a first message from M2M device 110. The first message may be indicative of a first emergency condition detected by M2M device 110. For example, the first message may indicate an emergency (e.g., a fire) or a characteristic of an emergency (e.g., smoke). PSAP gateway 104 may receive a second message from M2M device 112. The second message may be indicative of a second emergency condition detected by M2M device 112. For example, the second message may indicate an emergency (e.g., a flood) or a characteristic of an emergency (e.g., the presence of water). The emergency condition may indicate exceeding a temperature threshold, detection of smoke, detection of water, or detection of a collision. More examples of emergency conditions (e.g., emergencies and characteristics of emergencies) are discussed below with respect to FIG. 4. PSAP gateway 104 may determine a relative location of M2M device 110 and M2M device 112. For example, this may include determining a distance between M2M device 110 and M2M device 112, whether M2M device 110 and M2M device 112 are in the same vicinity (e.g., in the same building), or any other relative location between two devices. Based on the relative location, PSAP gateway 104 may determine whether the first emergency condition and the second emergency condition are indicative of the same emergency situation. For example, if M2M device 110 and M2M device 112 are in the same room, they may be indicative of the same emergency situation.

If the first emergency condition and the second emergency condition are indicative of the same emergency situation, gateway 104 may consolidate the first message and the second message into a consolidated alert to be provided to PSAP 102. For example, the consolidated message may indicate the presence of both smoke and water at a location near M2M device 110 or M2M device 112.

PSAP gateway 104 may determine a particular PSAP 102 to which to send the consolidated message. For example, PSAP gateway 104 may identify the particular recipient based on the emergency type of the same emergency situation identified by the first message and the second message. PSAP gateway 104 may identify PSAP 104 further based on a location of M2M device 110 or M2M device 112. After identifying PSAP 104, PSAP gateway 104 may provide the consolidated alert to PSAP 104.

If the first emergency condition and the second emergency condition are not indicative of the same emergency, gateway PSAP 104 may determine the priority of the first message based on the first condition and the priority of the second message based on the second condition. Messages can be prioritized based on any number of factors, including an emergency type indicated by the emergency condition. If the priority of the first message is higher than the priority of the second message (e.g., the first emergency condition indicates a life-threatening issue and the second emergency does not), PSAP gateway 104 may provide the first message to PSAP 102 prior to providing the second message to PSAP 102.

If the first emergency condition and the second emergency condition are not indicative of the same emergency, gateway PSAP 104 may determine whether the second emergency condition is indicative of a non-emergency situation. For example a message may indicate a condition that does not qualify as an emergency based on any number of factors. In some implementations, emergencies to which first responders do not respond, such as a leaky faucet or a fence left open, may not be approved emergency types. The approved emergency type may be based on a universal list of approved emergency types, or it may be based on a list of approved emergency types for a particular recipient. As another example, if the emergency type is a non-life-threatening theft, it may not be an approved emergency type for a fire-station recipient. Whether an emergency type is an approved emergency type may be based on any number of characteristics, including location of the source of the alert or the recipient, time (e.g., time of day or month), the recipient (e.g., first responder or guardian of infant), or any other factor. If the first emergency condition and the second emergency condition are not indicative of the same emergency, and the second emergency condition is indicative of a non-emergency situation, PSAP gateway 104 may provide the first message to PSAP 102.

If the second emergency condition is not indicative of the same emergency situation as the first emergency condition, PSAP gateway 104 may determine an identity of a second PSAP 112 based on a location of M2M device 112. Then, PSAP may provide the first message to PSAP 102 and the second message to second PSAP 112.

Figure 4:
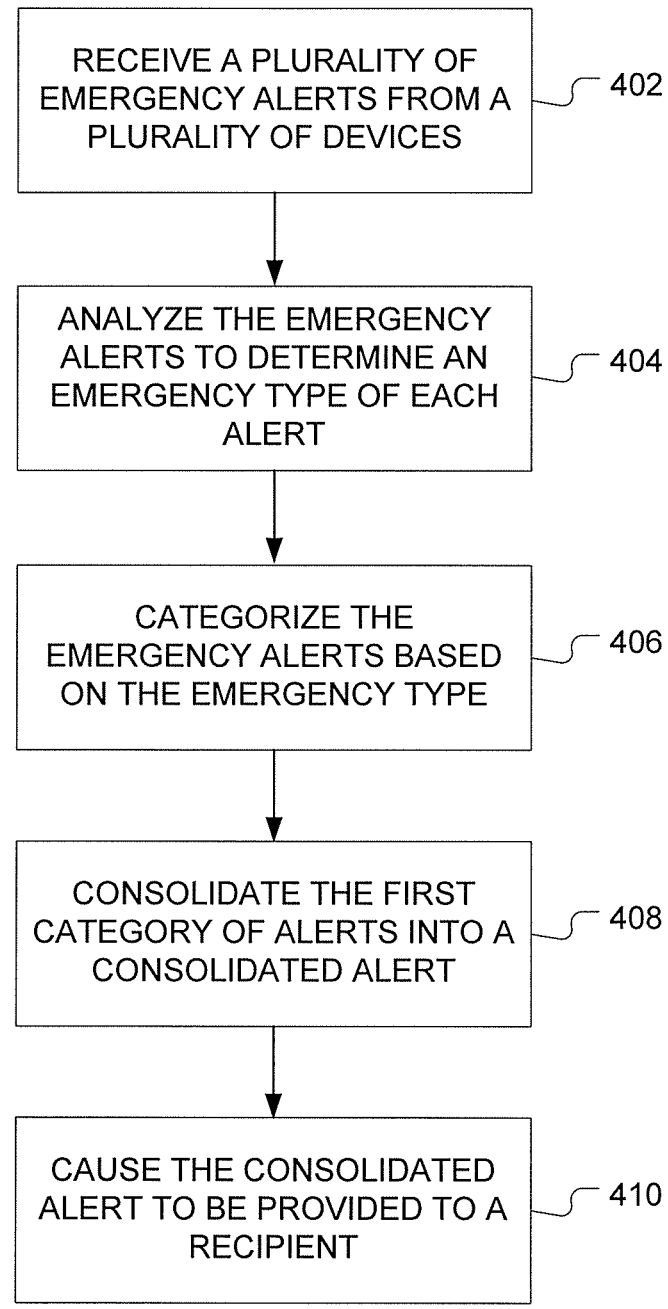
FIG. 4 is a flowchart of an exemplary process for providing emergency alerts to a PSAP.

FIG. 4 is a flowchart of an exemplary process 400 for providing emergency alerts to a PSAP. Process 400 may be implemented at least in part by PSAP gateway 104, network entity 300, or a combination thereof. However, for simplicity, exemplary process 400 is described with reference to PSAP gateway 104. At step 402, PSAP gateway 104 may receive a plurality of emergency alerts from a plurality of devices, such as M2M devices 108. For example, PSAP gateway 104 may receive a first emergency alert from M2M device 110, a second emergency alert from M2M device 112, or a third emergency alert from M2M device 114.

Emergency alerts may be indicative of a condition that may indicate an emergency or indicative of the emergency itself. For example, first emergency alert may indicate an emergency condition. The emergency condition may include a temperature threshold being exceeded, the presence of water, the presence of smoke, or the presence of a substance that exceeding a predefined threshold. The substance may be a chemical or chemical compound, like carbon monoxide or arsenic. Additionally or alternatively, the substance may be a combination of chemicals, such as rat poison or other pesticides. The substance may be in any form, including solid, liquid, or gas. The predefined threshold may be zero, so that any detection of the substance would constitute an emergency condition. For example, the emergency condition may include the presence of carbon monoxide. As another example, the emergency condition may include a level of carbon monoxide exceeding a predefined level. For example, very small amounts of carbon monoxide that may not be. As another example, second emergency alert may indicate a fire (an emergency). "Emergency" may be defined to encompass any number of scenarios, events, occurrences, or situations, and need not be limited to those types of emergencies addressed by emergency personnel or first responders. For example, an emergency may include, but not be limited to, a fire, an earthquake, a flood, a tornado, a hurricane, any other weather occurrence, a murder, a terrorist attack, an explosion, a detonation, a break-in, a trespassing, a kidnapping, a robbery, any other removal of a living thing or object from a predefined location, an accident, a collision, a car accident, a heart attack, a seizure, a shooting, any other health emergency, any other criminal-related emergency, an environmental or physical characteristic (e.g., temperature or pressure) that has exceeded a threshold or is otherwise outside the bounds of an acceptable range, a poisoning, a contamination, or the like. Additionally, "emergency" may encompass even scenarios, events, occurrences, or situations that are not urgent. For example, an emergency may include, but not be limited to receiving a package or a visitor, a change in weather conditions, an animal water bowl being empty, an infant awakening, a low battery level, a lack of power source, or the like. Generally, an emergency alert may be any message sent by any M2M device 108 designed to notify the recipient of a condition, scenario, event, occurrence, situation, or the like.

At step 404, PSAP gateway 104 may analyze the emergency alerts to determine an emergency type of each alert. The alert itself may include an identifier of its type. Additionally or alternatively, PSAP gateway 104 may determine the emergency type of an emergency alert based on the content or the source of the emergency alert. As an example, PSAP gateway 104 may determine that all emergency alerts from M2M device 110, which may be a smoke detector or a fire alarm, is a fire emergency type. Additionally or alternatively, PSAP gateway 104 may determine that an emergency alert indicating the presence of smoke is a fire emergency type. As another example, PSAP gateway 104 may determine the emergency alert type based on the location of M2M device 108. For example, PSAP gateway 104 may determine that emergency alerts from M2M devices 108 located in a water tank of potable water indicate a contamination emergency.

At step 406, PSAP gateway 104 may categorize the emergency alerts based on the emergency type. For example, an emergency alert indicating smoke from M2M device 110 and an emergency alert from fire alarm M2M device 112 may be categorized as fire-related, life-threatening, high priority, or the like. An emergency alert indicating theft of a vehicle may be categorized as criminal activity, theft, or the like. Categorizing an emergency alert may be based on other sensed or determined information. For example, if it is determined that the vehicle contains passengers, the emergency alert indicating vehicle theft may be categorized as a possible-kidnapping, a possible car-jacking, life-threatening, or the like. Alternatively, if it is determined that the stolen vehicle only contains the driver, the theft may be categorized as non-life-threatening. Categorizing the emergency alert may also be based on locations of M2M devices 108. For example, alerts from M2M devices 110 and 112, which may be located in the same room of a building, may be categorized together.

At step 408, alerts in a first category may be consolidated. For example, alerts may be consolidated by combining the data contained in the emergency alerts, deduping and merging the data, grouping the data, or the like. As an example, if multiple M2M devices 108 located in an apartment building provide emergency alerts, and each of the emergency alerts indicates one or more of a fire, a temperature threshold exceeded, or smoke, consolidating the emergency alerts may constitute creating a consolidated alert that indicates a fire in the apartment building. As another example, the consolidated alert may indicate a fire has been detected in apartments A, B, and C of the apartment building. In this example, consolidating the message may include deduping emergency alerts from multiple smoke detectors in apartment A or deduping emergency alerts from a smoke detector and a thermometer in apartment A. According to some implementations, PSAP gateway 104 may receive multiple alerts from M2M device 110, and creating the consolidated alert may include filtering the multiple alerts to remove duplicates (deduping), only including data from the most recent alert, or the like.

At step 410, PSAP gateway 104 may cause the consolidated alert to be provided to the recipient. For example, step 410 may comprise PSAP gateway 104 providing the consolidated alert to a recipient. As another example, PSAP gateway 104 may provide a message to the recipient that the consolidated alert is available for retrieval. Additionally or alternatively, the consolidated alert may be provided via a control plane of network 106.

The recipient of the consolidated alert in step 410 may be any device or person capable of receiving the consolidated alert. For example, if the consolidated alert indicates that an infant has stopped breathing, the recipient may be a device associated with a parent, guardian, or caretaker of the infant. Process 400 may comprise identifying the recipient. For example, the recipient may be identified based on the emergency type of the first category of messages. The consolidated alert may be directed to an emergency responder, such as PSAP 102. According to some implementations, process 400 may include determining a recipient based on the consolidated alert or the emergency alert. This may include determining a recipient based on the emergency type. If the consolidated alert is indicative of a fire, for example, the recipient may be PSAP 102 that may be communicatively connected to a fire department.

Additionally or alternatively, the recipient may be identified based on a location associated with a respective one of the plurality of M2M devices 108 from which at least one of the plurality of emergency alerts of the first category was received. As an example, identifying the recipient may include identifying a plurality of recipients within a geographic area of the location. If the consolidated alert is indicative of a fire, for example, the recipient may be PSAP 102 that may be communicatively connected to a fire department that services the geographical location of the fire or the recipient may be multiple PSAPs 102 if, the location of the fire is between two or more fire departments that are services by different PSAPs 102, or the like. As another example, multiple recipients may be identified if the fire is so large that requires responses from multiple fire departments.

Exemplary process 400 may include other steps. For example, additional information from M2M devices 108 may be desirable. As an example, PSAP gateway 104 may identify additional information based on, for example, the type or content of data indicated by the emergency alerts and/or the type of M2M devices 108. As another example, PSAP 102 may request additional information. PSAP gateway 104 may identify a subset of the M2M devices 108 from which the first category of emergency alerts was received and request, from at least one of the devices of that subset, additional data regarding the emergency. For example, additional data may include a location, the identity of other devices M2M device 108 can detect on the network, or other data indicative of a characteristic of the emergency, such as the temperature. In response, PSAP gateway 104 may receive a supplemental message indicative of the additional data and provide the additional data to the recipient. The additional data may be provided via a control plane of network 106 or via a user plane of network 106.

Figure 5:
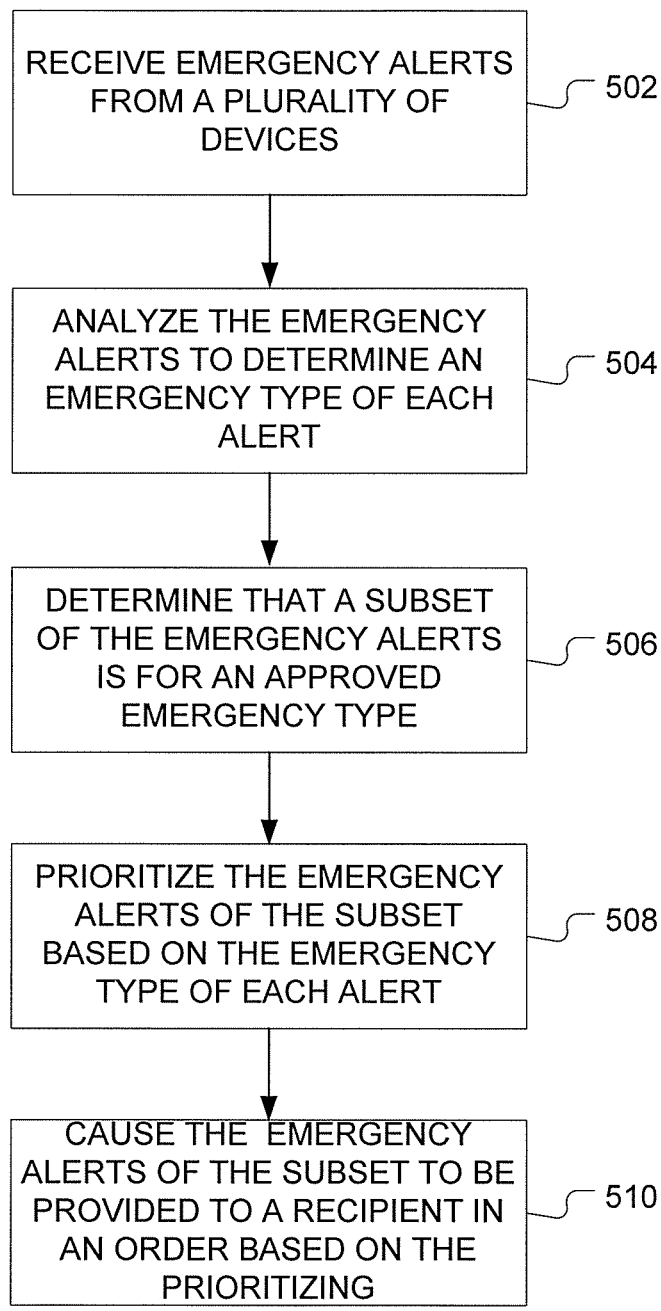
FIG. 5 is a flowchart of an exemplary process for providing emergency alerts to a PSAP.

FIG. 5 is a flowchart of an exemplary process 500 for providing emergency alerts to a PSAP. Process 500 may be implemented at least in part by PSAP gateway 104, network entity 300, or a combination thereof. However, for simplicity, exemplary process 400 is described with reference to PSAP gateway 104. At step 502, PSAP gateway 104 may receive a plurality of emergency alerts from a plurality of devices, such as M2M devices 108. For example, PSAP gateway 104 may receive a first emergency alert from M2M device 110, a second emergency alert from M2M device 112, or a third emergency alert from M2M device 114.

At step 504, PSAP gateway 104 may analyze the emergency alerts to determine an emergency type of each alert. The alert itself may include an identifier of its type. Additionally or alternatively, PSAP gateway 104 may determine the emergency type of an emergency alert based on the content or the source of the emergency alert. As an example, PSAP gateway 104 may determine that all emergency alerts from M2M device 110, which may be a smoke detector or a fire alarm, is a fire emergency type. Additionally or alternatively, PSAP gateway 104 may determine that an emergency alert indicating the presence of smoke is a fire emergency type. As another example, PSAP gateway 104 may determine the emergency alert type based on the location of M2M device 108. For example, PSAP gateway 104 may determine that emergency alerts from M2M devices 108 located in a water tank of potable water indicate a contamination emergency.

At step 506, PSAP gateway 104 may determine that a subset of the emergency alerts is for an approved emergency type. For example, not all emergency types may be approved. In some implementations, emergencies to which first responders do not respond, such as a leaky faucet or a fence left open, may not be approved emergency types. The approved emergency type may be based on a universal list of approved emergency types, or it may be based on a list of approved emergency types for a particular recipient. As another example, if the emergency type is a non-life-threatening theft, it may not be an approved emergency type for a fire-station recipient. Whether an emergency type is an approved emergency type may be based on any number of characteristics, including location of the source of the alert or the recipient, time (e.g., time of day or month), the recipient (e.g., first responder or guardian of infant), or any other factor.

In some implementations, PSAP gateway 104 may provide an indication to M2M device 108 that sent an alert of an unapproved emergency type message that its alert was rejected. This may enable M2M device 108 to transmit its alert to a different device.

At step 508, PSAP gateway 104 may prioritize emergency alerts of an approved emergency type. For example, if the emergency types of the alerts include a fire and a theft, the emergency alerts of the fire type may be prioritized higher than the emergency alerts of the theft type. In some embodiments, it may be desirable to prioritize life-threatening emergency types over non-life-threatening emergency types. Prioritization may be based on a ranking of emergency types. For example, a second category of emergency messages may be prioritized lower than the first category based on the emergency indicated by the first category (e.g., life-threatening) being ranked higher than the emergency indicated by the second category (e.g., non-life-threatening). Prioritization may be further based on any other factor, including the location of the emergency, the total number of recipients of the alerts, or the like.

At step 510, PSAP gateway 104 may provide the emergency alerts to the recipient in an order based on the prioritizing. For example, higher priority emergencies may be provided prior to lower priority emergencies. At least some of the emergency alerts may be provided to the recipient via a control plane of network 106. In some embodiments, lower priority alerts may be provided to the recipient at a lower transmission rate than is used for higher priority alerts. In some embodiments, lower priority alerts may be provided to the recipient at a lower quality-of-service ("QoS") level than is used for higher priority alerts. In scenarios where there are multiple messages prioritized at the same level (e.g., multiple messages having the same emergency type), process 500 may include consolidating multiple alerts into a consolidated alert, and step 510 may include causing the consolidated alert to be provided to the recipient.

Figure 6:
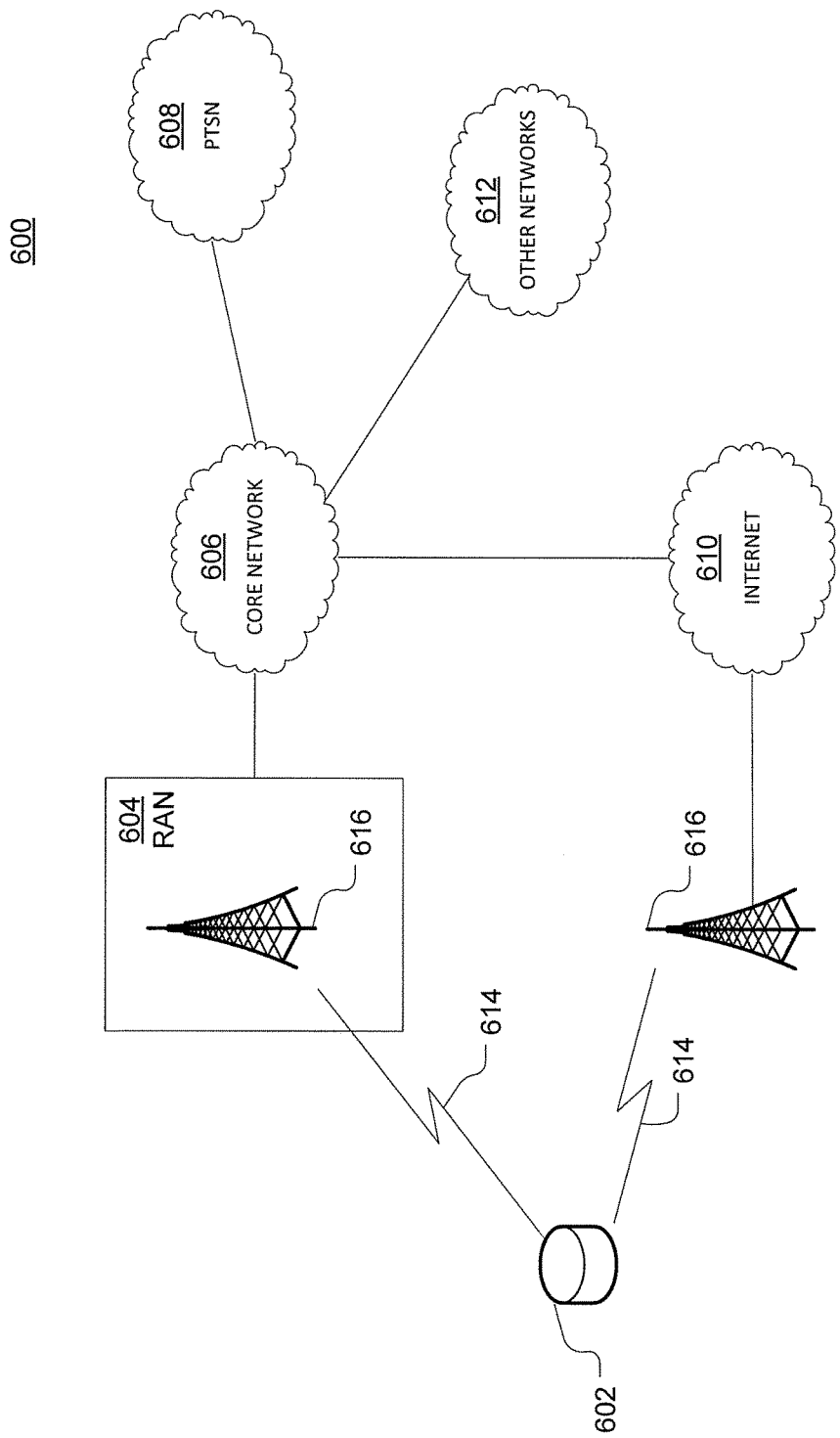
FIG. 6 is a diagram of an exemplary telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise M2M device 108, a mobile device, network entity 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
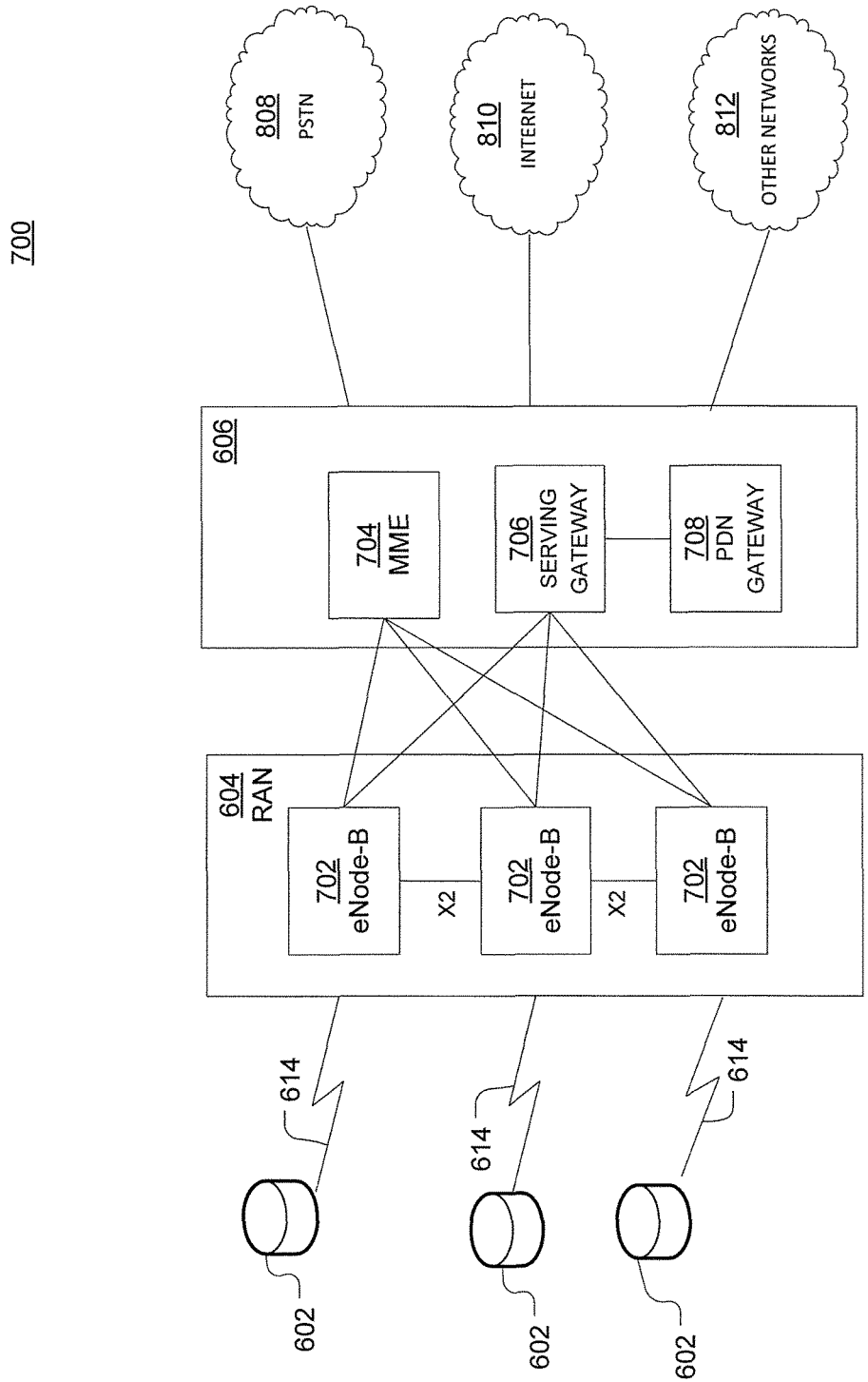
FIG. 7 is an example system diagram of a radio access network and a core network.

FIG. 7 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
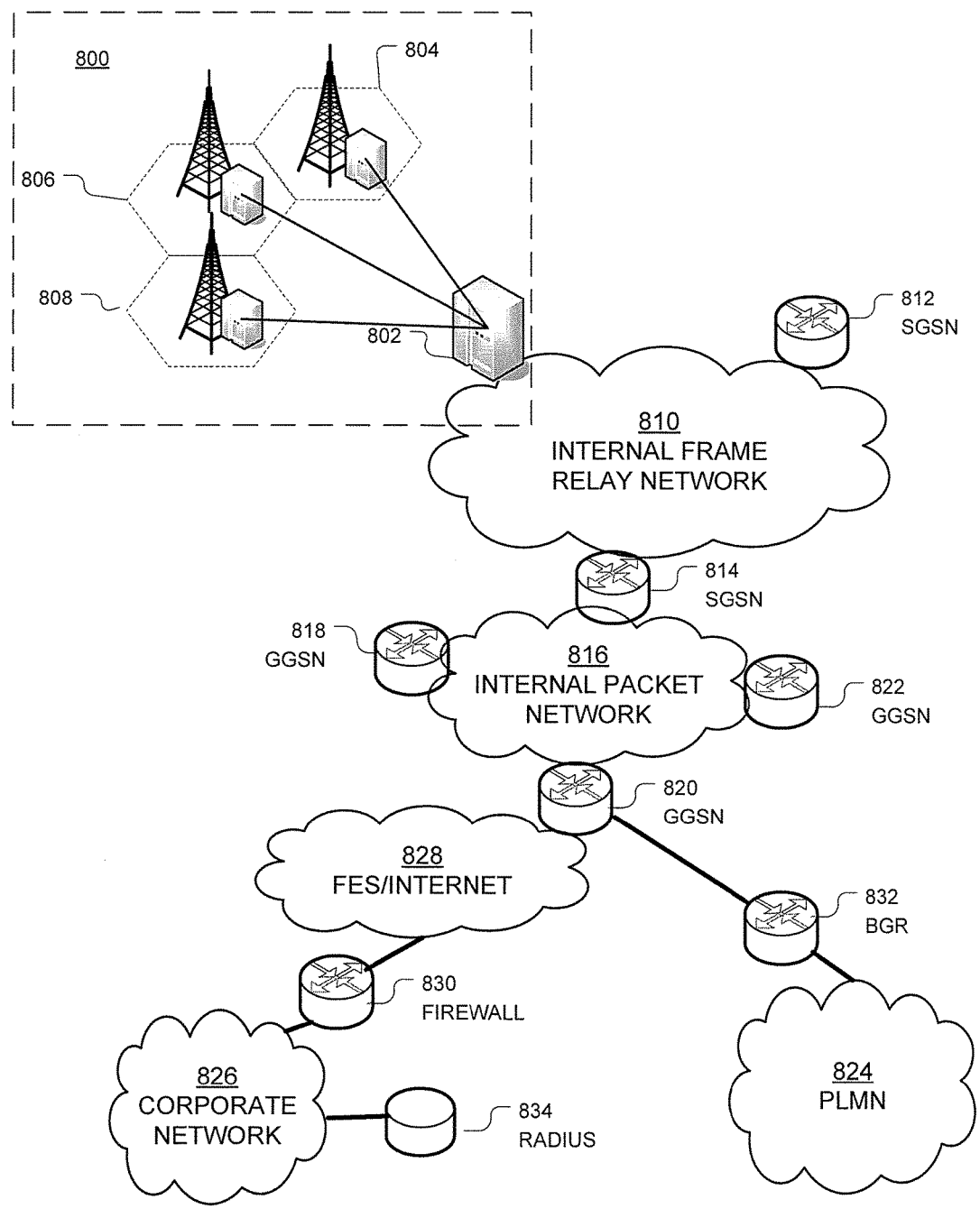
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a GSM network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
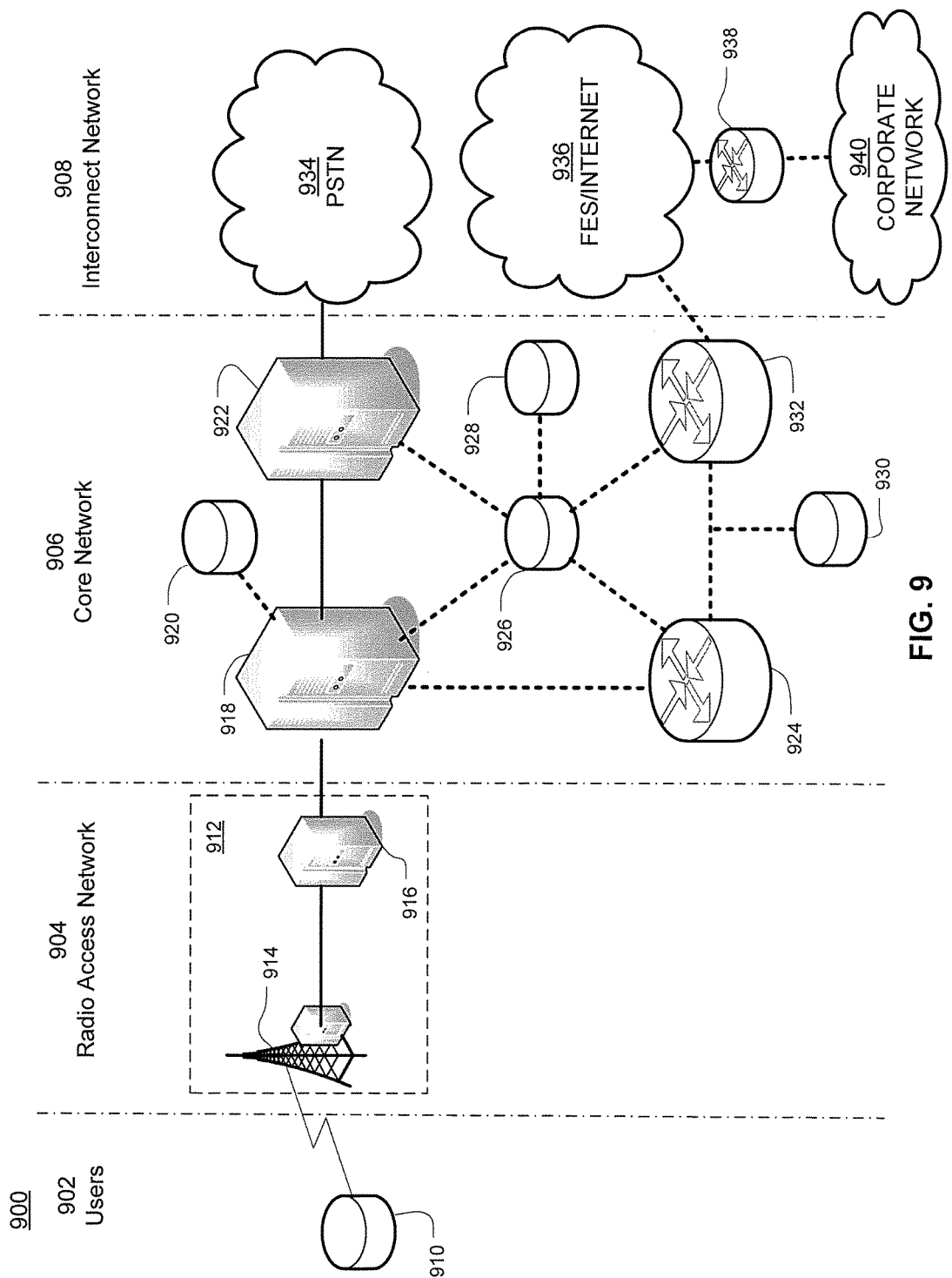
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device 102, mobile positioning center 116, network entity 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1138, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1138, to reach corporate network 940.

Figure 10:
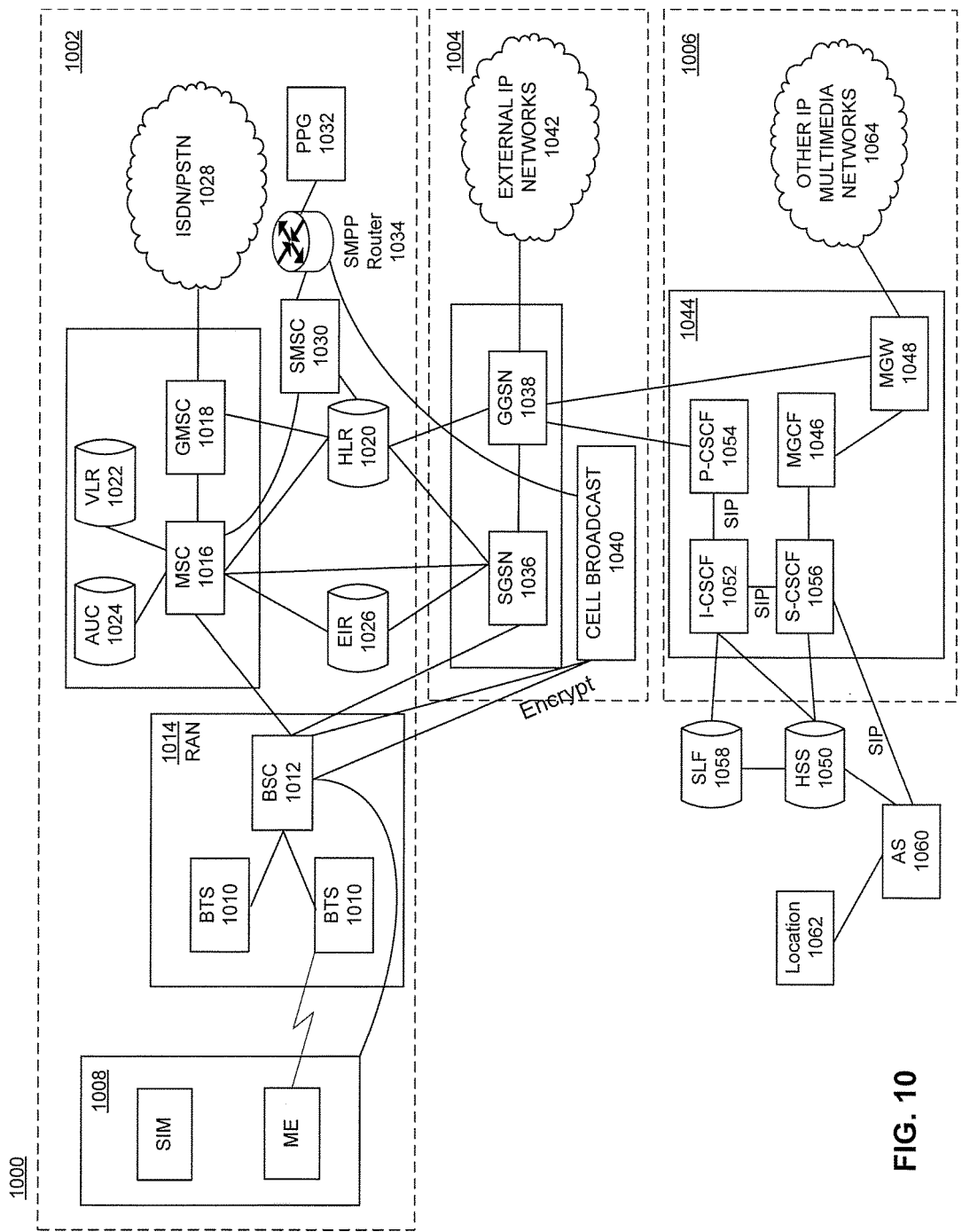
FIG. 10 illustrates an example block diagram view of a global system for mobile communications (GSM)/GPRS/ internet protocol (IP) multimedia network architecture.

FIG. 10 illustrates an example block diagram view of a GSM/GPRS/IP multimedia network architecture 1000 as described herein. As illustrated, architecture 1000 includes a GSM core network 1002, a GPRS network 1004 and an IP multimedia network 1006. GSM core network 1002 includes an MS 1008, a BTS 1010, and a BSC 1012. MS 1008 is physical equipment or mobile equipment, such as a mobile phone or a laptop computer that is used by mobile subscribers, with a SIM or a Universal Integrated Circuit Card (UICC). The SIM or UICC includes an IMSI which is a unique identifier of a subscriber. BTS 1010 is physical equipment, such as a radio tower, that enables a radio interface to communicate with MS 1008. Each BTS 1010 may serve more than one MS 1008. BSC 1012 manages radio resources, including BTS 1010. BSC 1010 may be connected to several BTSs 1010. BSC 1012 and BTS 1010 components, in combination, are generally referred to as a BSS or RAN 1014.

GSM core network 1002 also includes a MSC 1016, a GMSC 1018, an HLR 1020, a visitor location register (VLR) 1022, an AuC 1024, and an equipment identity register (EIR) 1026. MSC 1016 performs a switching function for the network. MSC 1016 also performs other functions, such as registration, authentication, location updating, handovers, or call routing. GMSC 1018 provides a gateway between GSM network 1002 and other networks, such as an Integrated Services Digital Network (ISDN) or PSTN 1028. Thus, the GMSC 1018 provides interworking functionality with external networks.

HLR 1020 is a database that contains administrative information regarding each subscriber registered in corresponding GSM network 1002. HLR 1020 also contains the current location of each MS. VLR 1022 is a database that contains selected administrative information from HLR 1020. VLR 1022 contains information necessary for call control and provision of subscribed services for each MS 1008 currently located in a geographical area controlled by VLR 1022. HLR 1020 and VLR 1022, together with MSC 1016, provide the call routing and roaming capabilities of GSM. AuC 1024 provides the parameters needed for authentication and encryption functions. Such parameters allow verification of a subscriber's identity. EIR 1026 stores security-sensitive information about the mobile equipment.

An SMSC 1030 allows one-to-one short message service (SMS) messages to be sent to or from MS 1008. A push proxy gateway (PPG) 1032 is used to "push" (i.e., send without a synchronous request) content to MS 1008. PPG 1032 acts as a proxy between wired and wireless networks to facilitate pushing of data to MS 802. A short message peer-to-peer (SMPP) protocol router 1034 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, or SMS, MS 1008 first registers with the network to indicate its current location by performing a location update and IMSI attach procedure. MS 1008 sends a location update including its current location information to the MSC 1016/VLR 1022, via BTS 1010 and the BSC 1012. The location information is then sent to HLR 1020 of MS 1008. HLR 1020 is updated with the location information received from the MSC 1016/VLR 1022. The location update also is performed when MS 1008 moves to a new location area. Typically, the location update is periodically performed to update the database as location updating events occur.

GPRS network 1004 is logically implemented on GSM core network 1002 architecture by introducing two packet-switching network nodes, an SGSN 1036, a cell broadcast and a GGSN 1038. SGSN 1036 is at the same hierarchical level as MSC 1016 in GSM network 1002. SGSN 1036 controls the connection between GPRS network 1004 and MS 1008. SGSN 1036 also keeps track of individual MS 1008's locations and security functions and access controls.

A cell broadcast center (CBC) 1040 communicates cell broadcast messages that are typically delivered to multiple users in a specified area. Cell broadcast is one-to-many geographically focused service. It enables messages to be communicated to multiple mobile phone customers who are located within a given part of its network coverage area at the time the message is broadcast.

GGSN 1038 provides a gateway between GPRS network 1002 and a PDN or other external IP networks 1042. That is, GGSN 1038 provides interworking functionality with external networks, and sets up a logical link to MS 1008 through SGSN 1036. When packet-switched data leaves GPRS network 1004, it is transferred to a TCP-IP network 1042, such as an X.25 network or the Internet. In order to access GPRS services, MS 1008 first attaches itself to GPRS network 1004 by performing an attach procedure. MS 1008 then activates a PDP context, thus activating a packet communication session between MS 1008, SGSN 1036, and GGSN 1038.

In a GSM/GPRS network, GPRS services and GSM services can be used in parallel. MS 1008 can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1004 can be designed to operate in three network operation modes (NOM1, NOM2 and NOM3). A network operation mode of GPRS network 1004 is indicated by a parameter in system information messages transmitted within a cell. The system information messages dictates MS 1008 where to listen for paging messages and how to signal towards the network. The network operation mode represents the capabilities of GPRS network 1004. In a NOM1 network, MS 1008 can receive pages from a circuit switched domain (voice call) when engaged in a data call. MS 1008 can suspend the data call or take both simultaneously, depending on the ability of MS 1008 S. In a NOM2 network, MS 1008 may not receive pages from a circuit switched domain when engaged in a data call, since MS 1008 is receiving data and is not listening to a paging channel. In a NOM3 network, MS 1008 can monitor pages for a circuit switched network while receiving data and vice versa.

IP multimedia network 1006 was introduced with 3GPP Release 5, and includes an IP multimedia subsystem (IMS) 1044 to provide rich multimedia services to end users. A representative set of the network entities within IMS 1044 are a call/session control function (CSCF), a media gateway control function (MGCF) 1046, a media gateway (MGW) 1048, and a master subscriber database, called a home subscriber server (HSS) 1050. HSS 1050 may be common to GSM network 1002, GPRS network 1004 as well as IP multimedia network 1006.

IMS 1044 is built around the call/session control function, of which there are three types: an interrogating CSCF (I-CSCF) 1052, a proxy CSCF (P-CSCF) 1054, and a serving CSCF (S-CSCF) 1056. P-CSCF 1054 is the MS 1008's first point of contact with IMS 1044. P-CSCF 1054 forwards session initiation protocol (SIP) messages received from MS 1008 to an SIP server in a home network (and vice versa) of MS 1008. P-CSCF 1054 may also modify an outgoing request according to a set of rules defined by the network operator (for example, address analysis or potential modification).

I-CSCF 1052 forms an entrance to a home network and hides the inner topology of the home network from other networks and provides flexibility for selecting an S-CSCF 1056. I-CSCF 1052 may contact a subscriber location function (SLF) 1058 to determine which HSS 1050 to use for the particular subscriber, if multiple HSSs 1050 are present. S-CSCF 1056 performs the session control services for MS 1008. This includes routing originating sessions to external networks and routing terminating sessions to visited networks. S-CSCF 1056 also decides whether an application server (AS) 1060 is required to receive information on an incoming SIP session request to ensure appropriate service handling. This decision is based on information received from HSS 1050 (or other sources, such as AS 1060). AS 1060 also communicates to a location server 1062 (e.g., a GMLC) that provides a position (e.g., latitude/longitude coordinates) of MS 1008.

HSS 1050 contains a subscriber profile and keeps track of which core network node is currently handling the subscriber. It also supports subscriber authentication and authorization functions. In networks with more than one HSS 1050, SLF 1058 may provide information on the HSS 1050 that contains the profile of a given subscriber.

MGCF 1046 provides interworking functionality between SIP session control signaling from IMS 1044 and ISUP/BICC call control signaling from the external GSTN networks (not shown). It also controls a MGW 1048 that provides user-plane interworking functionality (e.g., converting between AMR- and PCM-coded voice). MGW 1048 also communicates with other IP multimedia networks 1064.

PoC-capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the predefined area.

Figure 11:
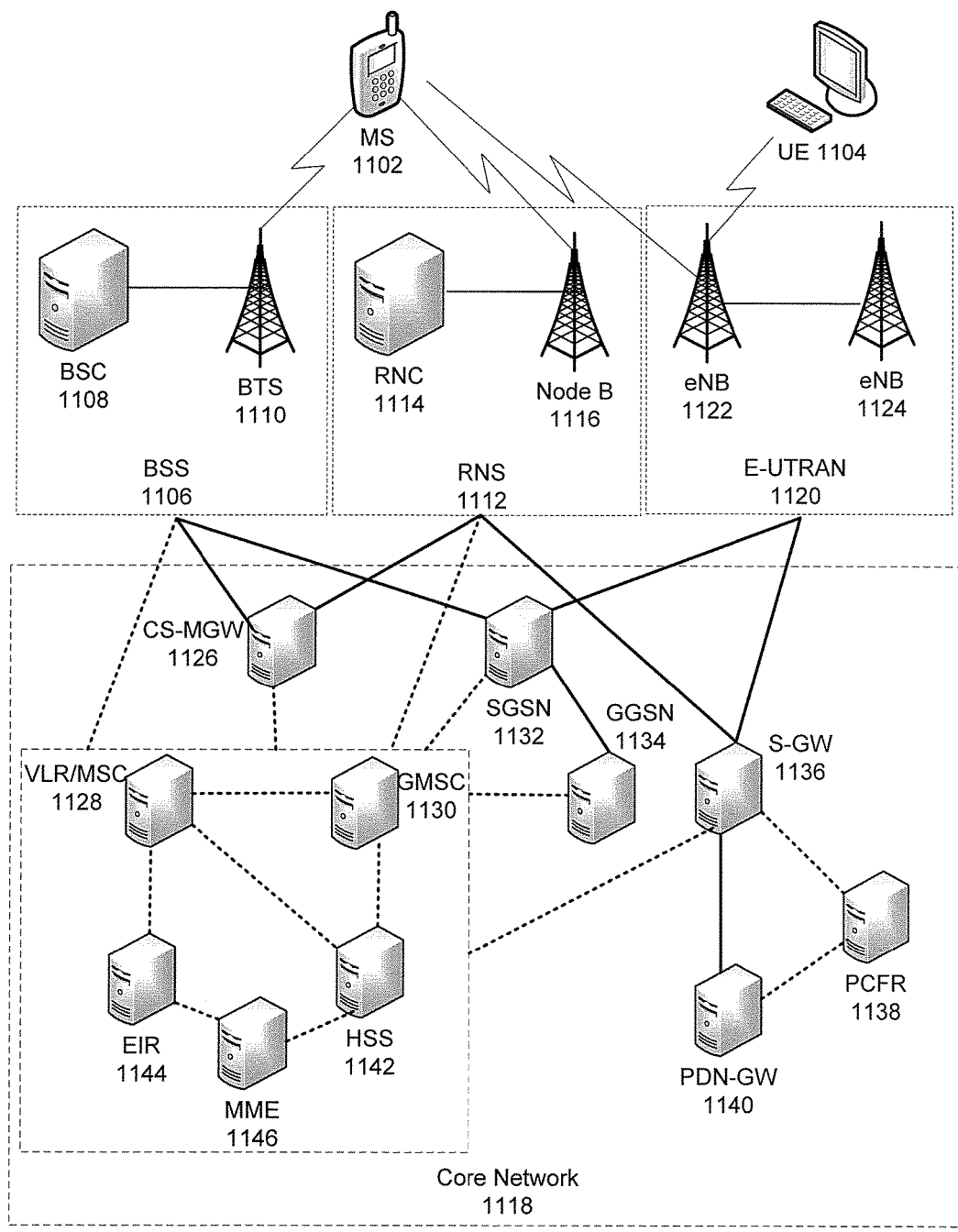
FIG. 11 is a block diagram of an exemplary public land mobile network (PLMN).

FIG. 11 illustrates a PLMN block diagram view of an example architecture that may be replaced by a telecommunications system. In FIG. 11, solid lines may represent user traffic signals, and dashed lines may represent support signaling. MS 1102 is the physical equipment used by the PLMN subscriber. For example, M2M device 108, network entity 300, the like, or any combination thereof may serve as MS 1102. MS 1102 may be one of, but not limited to, a cellular telephone, a cellular telephone in combination with another electronic device or any other wireless mobile communication device.

MS 1102 may communicate wirelessly with BSS 1106. BSS 1106 contains BSC 1108 and a BTS 1110. BSS 1106 may include a single BSC 1108/BTS 1110 pair (base station) or a system of BSC/BTS pairs that are part of a larger network. BSS 1106 is responsible for communicating with MS 1102 and may support one or more cells. BSS 1106 is responsible for handling cellular traffic and signaling between MS 1102 and a core network 1118. Typically, BSS 1106 performs functions that include, but are not limited to, digital conversion of speech channels, allocation of channels to mobile devices, paging, or transmission/reception of cellular signals.

Additionally, MS 1102 may communicate wirelessly with RNS 1112. RNS 1112 contains a Radio Network Controller (RNC) 1114 and one or more Nodes B 1116. RNS 1112 may support one or more cells. RNS 1112 may also include one or more RNC 1114/Node B 1116 pairs or alternatively a single RNC 1114 may manage multiple Nodes B 1116. RNS 1112 is responsible for communicating with MS 1102 in its geographically defined area. RNC 1114 is responsible for controlling Nodes B 1116 that are connected to it and is a control element in a UMTS radio access network. RNC 1114 performs functions such as, but not limited to, load control, packet scheduling, handover control, security functions, or controlling MS 1102 access to core network 1118.

An E-UTRA Network (E-UTRAN) 1120 is a RAN that provides wireless data communications for MS 1102 and user equipment 1104. E-UTRAN 1120 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1120 may include of series of logical network components such as E-UTRAN Node B (eNB) 1122 and E-UTRAN Node B (eNB) 1124. E-UTRAN 1120 may contain one or more eNBs. User equipment 1104 may be any mobile device capable of connecting to E-UTRAN 1120 including, but not limited to, a personal computer, laptop, mobile device, wireless router, or other device capable of wireless connectivity to E-UTRAN 1120. The improved performance of the E-UTRAN 1120 relative to a typical UMTS network allows for increased bandwidth, spectral efficiency, and functionality including, but not limited to, voice, high-speed applications, large data transfer or IPTV, while still allowing for full mobility.

An example of a mobile data and communication service that may be implemented in the PLMN architecture described in FIG. 11 is EDGE. EDGE is an enhancement for GPRS networks that implements an improved signal modulation scheme known as 8-PSK (phase shift keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically MS 1102 may communicate with any or all of BSS 1106, RNS 1112, or E-UTRAN 1120. In a illustrative system, each of BSS 1106, RNS 1112, and E-UTRAN 1120 may provide Mobile Station 1102 with access to core network 1118. Core network 1118 may include of a series of devices that route data and communications between end users. Core network 1118 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1126 is part of core network 1118, and interacts with VLR/MSC server 1128 and GMSC server 1130 in order to facilitate core network 1118 resource control in the CS domain. Functions of CS-MGW 1126 include, but are not limited to, media conversion, bearer control, payload processing or other mobile network processing such as handover or anchoring. CS-MGW 1118 may receive connections to MS 1102 through BSS 1106 or RNS 1112.

SGSN 1132 stores subscriber data regarding MS 1102 in order to facilitate network functionality. SGSN 1132 may store subscription information such as, but not limited to, the IMSI, temporary identities, or PDP addresses. SGSN 1132 may also store location information such as, but not limited to, GGSN 1134 address for each GGSN where an active PDP exists. GGSN 1134 may implement a location register function to store subscriber data it receives from SGSN 1132 such as subscription or location information.

Serving gateway (S-GW) 1136 is an interface which provides connectivity between E-UTRAN 1120 and core network 1118. Functions of S-GW 1136 include, but are not limited to, packet routing, packet forwarding, transport level packet processing, or user plane mobility anchoring for inter-network mobility. PCRF 1138 uses information gathered from P-GW 1136, as well as other sources, to make applicable policy and charging decisions related to data flows, network resources or other network administration functions. PDN gateway (PDN-GW) 1140 may provide user-to-services connectivity functionality including, but not limited to, GPRS/EPC network anchoring, bearer session anchoring and control, or IP address allocation for PS domain connections.

HSS 1142 is a database for user information and stores subscription data regarding MS 1102 or user equipment 1104 for handling calls or data sessions. Networks may contain one HSS 1142 or more if additional resources are required. Example data stored by HSS 1142 include, but is not limited to, user identification, numbering or addressing information, security information, or location information. HSS 1142 may also provide call or session establishment procedures in both the PS and CS domains.

VLR/MSC Server 1128 provides user location functionality. When MS 1102 enters a new network location, it begins a registration procedure. A MSC server for that location transfers the location information to the VLR for the area. A VLR and MSC server may be located in the same computing environment, as is shown by VLR/MSC server 1128, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1102 registration or procedures for handover of MS 1102 to a different section of core network 1118. GMSC server 1130 may serve as a connection to alternate GMSC servers for other MSs in larger networks.

EIR 1144 is a logical element which may store the IMEI for MS 1102. User equipment may be classified as either "white listed" or "black listed" depending on its status in the network. If MS 1102 is stolen and put to use by an unauthorized user, it may be registered as "black listed" in EIR 1144, preventing its use on the network. A MME 1146 is a control node which may track MS 1102 or user equipment 1104 if the devices are idle. Additional functionality may include the ability of MME 1146 to contact idle MS 1102 or user equipment 1104 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
    receiving, at a server connected to a network, a plurality of emergency alerts from a plurality of devices connected to the network;
    analyzing, by the server, the plurality of emergency alerts to determine an emergency type of each of the plurality of emergency alerts;
    categorizing, by the server, the plurality of emergency alerts based on the emergency type of each of the plurality of emergency alerts;
    consolidating the plurality of emergency alerts of a first category into a consolidated alert;
    consolidating the plurality of emergency alerts of a second category into a second consolidated alert;
    prioritizing the second category lower than the first category based on at least the emergency type indicated by the first category being ranked higher than the emergency type indicated by the second category; and
    causing the consolidated alert to be provided to a recipient at a first transport QoS level before causing the second consolidated alert to be provided to the recipient at a lower transport QoS level than the first transport QoS level.

2. The method of claim 1, further comprising:
    identifying a subset of the plurality of devices from which the first category of the plurality of emergency alerts was received;
    requesting, from at least one of the subset of the plurality of devices, additional data regarding the emergency;
    receiving, from the at least one of the subset of the plurality of devices, a supplemental message indicative of the additional data; and
    providing the additional data to the recipient.

3. The method of claim 2, wherein causing the consolidated alert to be provided to the recipient comprises providing the consolidated alert via a control plane of the network and wherein providing the additional data to the recipient comprises providing the additional data via a user plane of the network.

4. The method of claim 1, wherein categorizing the plurality of emergency alerts comprises, for each of the plurality of emergency alerts, identifying the recipient based on at least one of the emergency type and a location associated with a respective one of the plurality of devices from which at least one of the plurality of emergency alerts of the first category was received.

5. The method of claim 4, wherein identifying the recipient comprises identifying a plurality of recipients within a geographic region including the location.

6. The method of claim 1, wherein at least one of the plurality of devices comprises a machine-to-machine device.

7. The method of claim 1, wherein the emergency type comprises at least one of a fire, an accident, a flood, a break-in, a terrorist threat, a robbery, a kidnapping, a poisoning, a health emergency, a murder, an explosion, or a tornado.

8. The method of claim 1, wherein the plurality of emergency alerts are received on a control plane of the network.

9. A method comprising:
    receiving, at a server connected to a network, emergency alerts from a plurality of devices connected to the network;
    analyzing, by the server, the emergency alerts to determine an emergency type of each of the emergency alerts;
    determining that a subset of the emergency alerts is for an approved emergency type;
    prioritizing a second category of the subset, lower than a first category of the subset based on at least an emergency indicated by the first category being ranked higher than a second emergency indicated by the second category;
    consolidating the first category into a first consolidated alert and consolidating the second category into a second consolidated alert; and
    causing the first consolidated alert to be provided to a recipient at a first transport QoS level before causing the second consolidated alert to be provided to the recipient at a lower transport QoS level than the first transport QoS level.

10. The method of claim 9, wherein at least one of the emergency alerts is not part of the subset, the method further comprising providing a message to at least one of the plurality of devices from which the at least one of the emergency alerts was received, wherein the message indicates that the at least one of the emergency alerts was rejected.

11. The method of claim 9, wherein at least one of the devices is a machine-to-machine device.

* * * * *